United States Patent
Koduru et al.

(10) Patent No.: US 10,147,326 B2
(45) Date of Patent: Dec. 4, 2018

(54) SYSTEMS AND METHODS OF GATHERING AND DISTRIBUTING CRITICAL WEATHER EVENT INFORMATION

(71) Applicant: Honeywell International Inc., Morris Plains, NJ (US)

(72) Inventors: Anantha Chandrasekhar Koduru, Secunderabad (IN); Kenneth R. Jongsma, Tijeras, NM (US); Sibu Parakkattu Narayanan, Bangalore (IN); Subhadip Datta, Hyderabad (IN); Siva Gudla, Hyderabad (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/443,298

(22) Filed: Feb. 27, 2017

(65) Prior Publication Data
US 2018/0247542 A1 Aug. 30, 2018

(51) Int. Cl.
*G08G 5/00* (2006.01)
*G01C 23/00* (2006.01)
(Continued)

(52) U.S. Cl.
CPC ........... *G08G 5/0013* (2013.01); *G01C 21/20* (2013.01); *G01C 23/00* (2013.01); *G01S 13/953* (2013.01);
(Continued)

(58) Field of Classification Search
CPC .. G08G 5/0013; G08G 5/0008; G08G 5/0021; G08G 5/0034; G08G 5/0047;
(Continued)

(56) References Cited

U.S. PATENT DOCUMENTS 3,385,569 A * 5/1968 Bookout ............... A47J 31/401
222/129.4
4,521,857 A 6/1985 Reynolds
(Continued)

FOREIGN PATENT DOCUMENTS

EP 2550647 A1 1/2013
EP 2 933 663 A2 10/2015
(Continued)

OTHER PUBLICATIONS

Partial European Search Report dated Jun. 6, 2018 issued in related EP patent application No. 18 15 7979.8.

*Primary Examiner* — Hongmin Fan
(74) *Attorney, Agent, or Firm* — Bookoff McAndrews PLLC (57) ABSTRACT

A method of gathering and distributing critical weather event information is provided. The method includes monitoring for critical weather events based on defined critical weather event thresholds with an onboard producer weather detection unit of at least one producer vehicle. The critical weather event thresholds are dynamically reconfigured based at least in part on consumption needs of the consumer vehicle. The detected critical weather event and associated time stamp and geolocation information are communicated to a base station. The detected critical weather event is fused with other weather data at the base station to produce a unified weather event image that includes the detected critical weather event. Prediction algorithms are applied to the unified weather event image and are parsed into predefined grid cells of a geo-spatial grid. The predicted weather data is up-linked to a consumer vehicle anticipated to travel within at least one grid cell of the geo-spatial grid.

20 Claims, 4 Drawing Sheets

(51) Int. Cl.
*G01W 1/00* (2006.01)
*G01W 1/08* (2006.01)
*G01C 21/20* (2006.01)
*G01S 13/95* (2006.01)
*G01W 1/06* (2006.01)

(52) U.S. Cl.
CPC ............... *G01W 1/00* (2013.01); *G01W 1/06* (2013.01); *G01W 1/08* (2013.01); *G08G 5/0008* (2013.01); *G08G 5/0021* (2013.01); *G08G 5/0034* (2013.01); *G08G 5/0047* (2013.01); *G08G 5/0091* (2013.01); *G01W 2001/006* (2013.01)

(58) Field of Classification Search
CPC ....... G08G 5/0091; G01C 21/20; G01W 1/06; G01W 1/02; G01S 13/953
See application file for complete search history.

(56) References Cited

U.S. PATENT DOCUMENTS

| | | | | |
|---|---|---|---|---|
| 5,644,973 A | * | 7/1997 | Kang | A47J 31/40 99/289 R |
| 6,043,756 A | * | 3/2000 | Bateman | G01S 7/003 340/945 |
| 6,501,392 B2 | | 12/2002 | Gremmert et al. | |
| 6,972,696 B2 | | 12/2005 | Rogers et al. | |
| 7,817,078 B2 | | 10/2010 | Bunch | |
| 7,835,866 B2 | | 11/2010 | Tzidon | |
| 8,085,182 B2 | | 12/2011 | Kauffman | |
| 8,131,407 B1 | * | 3/2012 | Robinson | G01C 23/00 340/945 |
| 8,223,062 B2 | | 7/2012 | Bunch et al. | |
| 8,639,401 B2 | * | 1/2014 | Bailey | G08G 5/0013 701/14 |
| 8,674,850 B2 | * | 3/2014 | Zimmer | G08G 5/0091 340/500 |
| 9,223,020 B1 | * | 12/2015 | Crosmer | G01S 13/951 |
| 9,805,372 B2 | * | 10/2017 | Gong | H04L 63/101 |
| 9,805,607 B2 | * | 10/2017 | Gong | H04L 63/101 |
| 2002/0039072 A1 | * | 4/2002 | Gremmert | G01S 7/003 340/945 |
| 2004/0244476 A1 | | 12/2004 | Andrews et al. | |
| 2009/0150012 A1 | * | 6/2009 | Agam | G01C 23/005 701/3 |
| 2010/0245164 A1 | | 9/2010 | Kauffman | |
| 2015/0025788 A1 | * | 1/2015 | Crain | G01S 5/02 701/400 |
| 2017/0169713 A1 | * | 6/2017 | Gong | H04L 63/101 |
| 2017/0316701 A1 | * | 11/2017 | Gil | B64D 1/00 |
| 2017/0325082 A1 | * | 11/2017 | Rowe | G06Q 30/02 |
| 2017/0331899 A1 | * | 11/2017 | Binder | H04L 67/12 |
| 2017/0372623 A1 | * | 12/2017 | Srivastav | G06Q 30/0283 |

FOREIGN PATENT DOCUMENTS

| | | |
|---|---|---|
| WO | 1999040457 A1 | 8/1999 |
| WO | 2011117242 A1 | 9/2011 |
| WO | WO 2016/125139 A2 | 8/2016 |

* cited by examiner

FIG. 4

SYSTEMS AND METHODS OF GATHERING AND DISTRIBUTING CRITICAL WEATHER EVENT INFORMATION

BACKGROUND

Having current weather information is imperative for the safety of aircraft travel. Improved weather gathering systems allow for the sharing of real-time weather data as detected by an onboard weather radar (further referred as producer) to a ground center. This weather data may get processed (applying data fusion & prediction algorithms) and unified with other weather data at the ground station. This unified weather data may be up-linked to a subscribed aircraft (further referred as consumer). Hence, this system allows for the gathering and collating of weather information from a plurality of resources. In a typical system, a request for weather information is initiated from the ground (e.g. a global data center) and in response, an onboard weather radar sends the applicable weather data that has been requested. This data gets processed on the ground and further gets up-linked to the consumer aircraft where it is displayed on cockpit displays, electronic flight bag or tablet computer as an overlay. There are specific message formats defined for both up-link and down-link data. Data gets exchanged between the producers, ground data center and the consumers in these pre-defined data formats. For example, the up-link request may be a request for a particular weather phenomenon such as, hail, lightning, turbulence, wind shear etc. or it may be combination of one or more such weather phenomenon. In response, a producer responds back to the ground data center with the data that has been requested.

Based on need, getting required data from a preferred source aircraft may work well with such a 'request-response' protocol discussed above. However, there are deficiencies with this protocol. Firstly, the request from ground is made without the knowledge of what weather phenomenon is being detected by the onboard weather radar at the particular geographical location of interest. Secondly, only the data detected at the instance of receiving the request gets down-linked, and only for those parameters that have been requested. Thirdly, there lies a definite possibility that any of the critical weather data that has been detected (further referred as event) by the onboard weather radar might go unshared/down-linked, because there might not have been a ground request at that particular instance when there was an occurrence of critical weather event. Fourthly, ground data center prediction algorithms heavily rely on the accuracy and timeliness of the data as downlinked from the producer aircraft. The more current the data, the more accurate the weather prediction. Fifthly, with the existing protocol, significant ground data center processing is required. The processing needs to identify producers that could generate relevant data, make requests to those particular aircraft, get the data down-linked, fuse it and up-link to consumers. This processing is time consuming and could introduce latencies in providing data to the consumers. An alternate approach could be where producer aircraft down-link weather data continuously to a ground center without depending on any of the ground requests (i.e. streaming). However the data-link costs that incur in such type of continuous down-link can be large, especially keeping in view the volume of data that gets down-linked.

For the reasons stated above and for other reasons stated below which will become apparent to those skilled in the art upon reading and understanding the present specification, there is a need in the art for a system to gather and disseminate critical weather information in an efficient and cost effective manner.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. Embodiments provide methods and systems for gathering and dispersing critical weather events to a consumer vehicle.

In one embodiment, a method of gathering and distributing critical weather event information is provided. The method includes monitoring for critical weather events based on defined critical weather event thresholds with an onboard producer weather detection unit of at least one producer vehicle. Current time stamp and geolocation information are associated with each detected critical weather event. The detected critical weather event, associated time stamp and geolocation information are communicated to a base station. The detected critical weather event is fused with other weather data at the base station to produce a unified weather event image that includes the detected critical weather event. Prediction algorithms are applied to the unified weather event image at the base station to produce predicted weather data including the detected critical weather event parsed into predefined grid cells of a geo-spatial grid. The predicted weather data with the detected critical weather event is up-linked to a consumer vehicle anticipated to travel within at least one grid cell of the geo-spatial grid associated with the predicted weather data. In addition, critical weather event thresholds are dynamically reconfigured at the producer vehicle based at least in part on consumption needs of the consumer vehicle.

In another embodiment, a method of gathering and distributing critical weather event information is provided. The method includes monitoring at least one sensor of at least one producer for critical weather events based on critical weather event thresholds. A geo-location tag and a time stamp is attached to monitored critical weather events by the at least one producer. Critical weather events are down-linked from the at least one producer vehicle to a base station. The detected critical weather event are fused with other weather data at the base station to produce a unified weather event image including the detected critical weather event. The unified weather event image is applied to a geo-spatial grid over a travel area. The geo-spatial grid has a plurality of grid cells. A bounding box is determined for a consuming vehicle. The size of the bounding box is configured based on consumption needs of the consumer vehicle. The bounding box is in the immediate travel path of consumer vehicle represented on the geo-spatial grid. A critical weather event is up-linked to the consumer aircraft when the bounding box overlaps at least one grid cell of the geo-spatial grid associated with the critical weather event.

In still another embodiment, a base station to gather and distribute critical weather event information is provided. The base station includes a data communication manager, at least one memory and at least one processor. The data communication manager is configured to communicate with at least one producer vehicle and at least one consumer vehicle. The at least one memory is configured to store at least operating instructions and critical weather alert information. The at least one processor is configured to execute the operating instructions. The base station further includes a producer domain that is implemented by the at least one processor. The producer domain is in communication with the data communication manager. The producer domain includes a weather data fusion and prediction element that is configured to fuse critical weather event data communicated from the at least one producer vehicle with other weather gathering sources to generate a unified weather event image and forecast information for an area of travel that is overlaid with a geo-spatial grid. The geo-spatial grid having a plurality of grid cells. Each grid cell associated with a location in the area of travel and an associated portion of the unified weather event image and forecast information. The producer domain configured to store the unified weather event image and forecast information and geo-spatial grid in the at least one memory. The base station further includes a consumer domain. The consumer domain is implemented by the at least one processor and is in communication with the data communication manager. The consumer domain includes a consumer data processing element that is configured to determine a consumer vehicle location and travel path information for the at least one consumer vehicle. The consumer data processing element is further configured to determine a bounding box for the at least one consumer vehicle. The size of the bounding box being configurable based on consumption needs of the at least one consumer vehicle. The bounding box being in an immediate travel path of the at least one consumer vehicle represented on the geo-spatial grid. The consumer data processing element is configured to identify identifying critical weather events for the at least one consumer vehicle by determining an overlapping of the bounding box of the at least one consumer vehicle with at least one grid cell of the geo-spatial grid associated with critical weather event data. The consumer domain further being configured to generate a critical weather event message to be sent to the at least consumer vehicle via the communication manager upon determination of the overlap.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
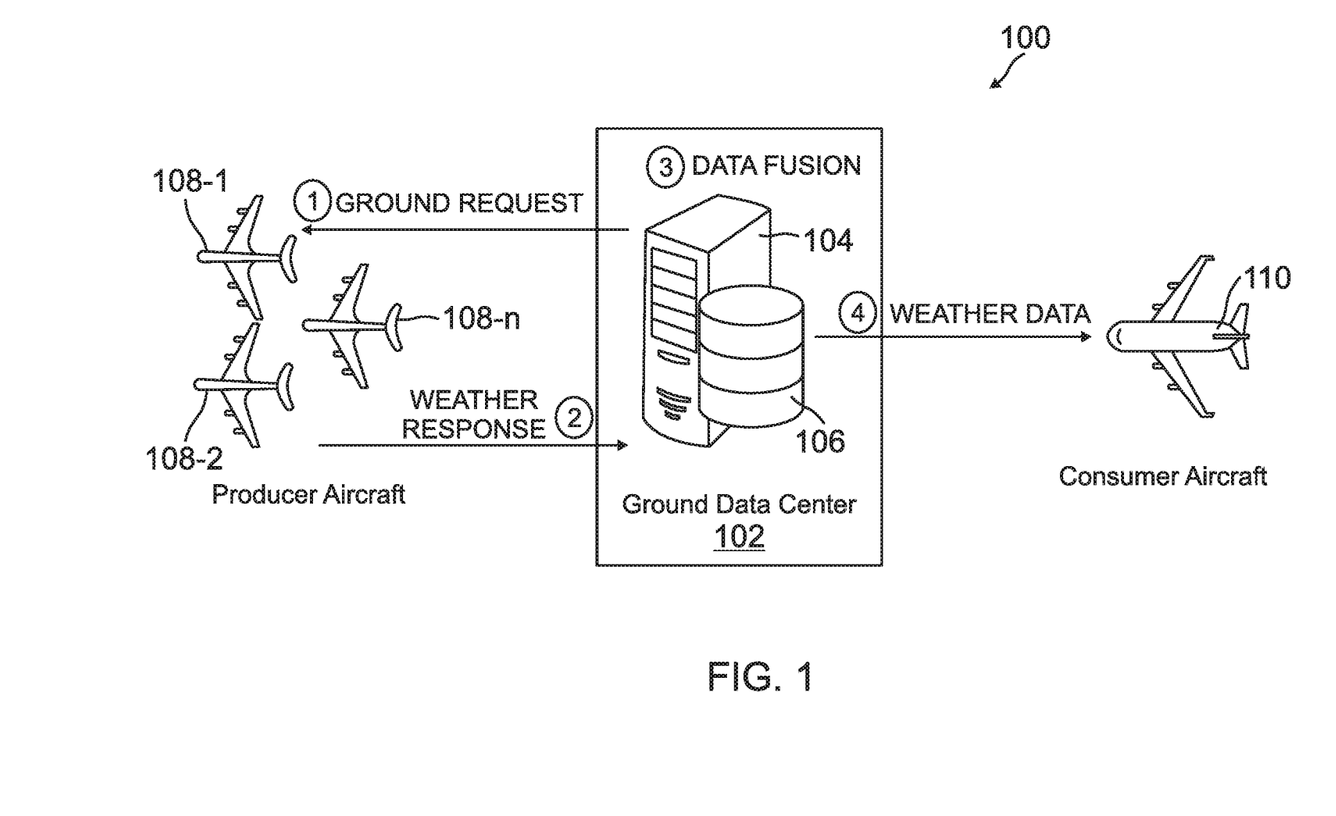
FIG. 1 is an illustration of a communication system of an embodiment.

Embodiments of the present invention provide systems and methods that allows a ground data center to automatically identify and trigger critical weather alerts to a consumer vehicle, such as a consumer aircraft. Referring to FIG. 1, an example of a communication system 100 implementing embodiments is illustrated. The communication system 100 includes a ground data center 102. The ground data center 102 includes a processing station 104 with one or more processors and memories. The memory holds one or more data bases 106. The communication system 100 further includes a plurality of producer aircrafts 108-1 through 108-n that are in communication with the ground data center 102. As discussed in detail below, the producer aircrafts 108-1 through 108-n provide information such as weather information requested by the ground data center 102. The ground data center processes gathered information from the producer aircrafts 108-1 through 108-n and other sources and provides it to the consumer aircraft 110 as discussed in detail below. Although, this communication system is described as applying to an aircraft communication system other types of communication systems benefiting from this type of information system are contemplated, such as, but not limited to, other types of vehicle communication systems. Hence, the ground data center may generally referred to as a base station 102, the producer aircrafts can generally referred to as producer vehicles 108-1 through 108-n and the consumer aircraft may generally referred to as a consumer vehicle 110.

In general, the processing station 104 may include any one or more of a processor, microprocessor, a digital signal processor (DSP), an application specific integrated circuit (ASIC), a field program gate array (FPGA), or equivalent discrete or integrated logic circuitry. In some example embodiments, processing station 104 may include multiple components, such as any combination of one or more microprocessors, one or more controllers, one or more DSPs, one or more ASICs, one or more FPGAs, as well as other discrete or integrated logic circuitry. The functions attributed to the processing station 104 herein may be embodied as software, firmware, hardware or any combination thereof. Memories within the processing station 104 may include computer-readable operating instructions that, when executed by the processing station 104 provides functions of the communication system 100. Such functions may include the functions relating to obtaining auto up-linking critical weather alerts described below. The computer readable instructions may be encoded within the memory. Memory may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Embodiment systems allow management of data pertaining to registered consumer aircrafts (flight plan, time of departure, time of arrival, wing load capacity etc.) via a database 106. Example systems allow updates to the current location of the consumer aircraft 110 on a periodic basis, so as to define an updated region of interest for the consumer aircraft 110. In absence of periodic updates, an updated region of interest may be calculated based on the probabilistic position of the consumer aircraft 110. Corrections to the prediction of region of interest may be made when position updates are shared by the consumer aircraft 110.

Embodiments implement a method to decode weather data as down-linked from producer aircrafts 108-1 through 108-n, process the data (applying data fusion algorithms) and store the geo-spatially resolved weather data into a data base 106 (into the associated pre-defined geo-spatial grids). Attributes get associated with the critical weather data. Example attributes include position information (latitude, longitude & altitude), a Universal Time Constant (UTC) data, confidence level with which the data has been detected (which may depend on how close the data has been observed from the producer aircraft 108-1 through 108-n).

Embodiments allow dynamic reconfiguration of the configurable file containing weather thresholds of interest (available in the producer aircraft) via a request in real time. Embodiments, further allow for identification of relevant producer aircraft 108-1 through 108-n that can supply the required weather information based on the consumption need of the consumer aircraft. Moreover, embodiments enable specific weather hazard features (such as the ability to re-configuring the configuration file of a producer aircraft such that it shall downlink only the configured parameters) based on needs of a consumer aircraft 110. The needs may depend on the current phase of a flight. For example, predictive wind shear is needed while a consumer is flying near to ground and not in cruise mode. Hail/lightning information is relevant when the consumer aircraft 110 is in cruise mode etc. Moreover regions of interest are provided where the consumer aircraft 110 is currently flying. In some embodiments, appropriate threshold limits are configured for critical weather data depending on the consumer aircraft 110 type/geo-graphical positions. In addition, embodiments may configure the periodicity of processing and downlinking of the critical weather data. For example, data may be processed at every 20 nm, 40 nm, 80 nm, 160 nm, 320 nm or etc.

A method to process and check for the presence of critical weather events (event classification based on consumer aircraft need, within the downlinked weather from various producer aircraft 108-1 through 108-n) in the regions of overlap between the region of interest pertaining to that of a consumer aircraft 110 (which is configurable, for example 80 nm ahead on the flight path from the current location of the consumer aircraft 110) and the pre-defined grid cells of a geo-spatial grid is provided in an embodiment. Moreover, a method to trigger auto up-link messages to the identified consumer aircraft 110, upon detecting the presence of any of the critical weather events in the region of interest is provided in an embodiment. In addition system embodiments allow for the determination of the criticality of the weather event (dynamic event classification) based on the type of the consumer aircraft 110 (wing load capability) and its flight context (flight phase, region in which the flight is flying etc.).

In an embodiment, a system allows producer aircraft 108-1 through 108-n to share information pertaining to weather with the ground data center 102, upon detecting the occurrence of any pre-defined critical weather event. The system provides a trigger for an automatic down-link upon detection of such critical weather events. Every such event or weather update may trigger execution of the data fusion and weather predicting algorithms that is running in the ground data center 102. Also, embodiments store data into the onboard system of the produce aircrafts 108-1 through 108-n in case there isn't any communication link available at the current time. Embodiments store the data along with a time stamp UTC and once the link is available, the stored is down-linked to the ground station center 102. In addition, in embodiments allow a ground data center 102 to fetch and auto up-link the critical weather event data as applicable (based on the flight plan and wing load) to registered consumer aircrafts 110. Although, FIG. 1 illustrates one registered consumer aircraft 110, any number of registered consumer aircraft 100 may be provided the critical weather event data as needed. Hence, a plurality of registered consumer aircraft 100 can be serviced.

Figure 2:
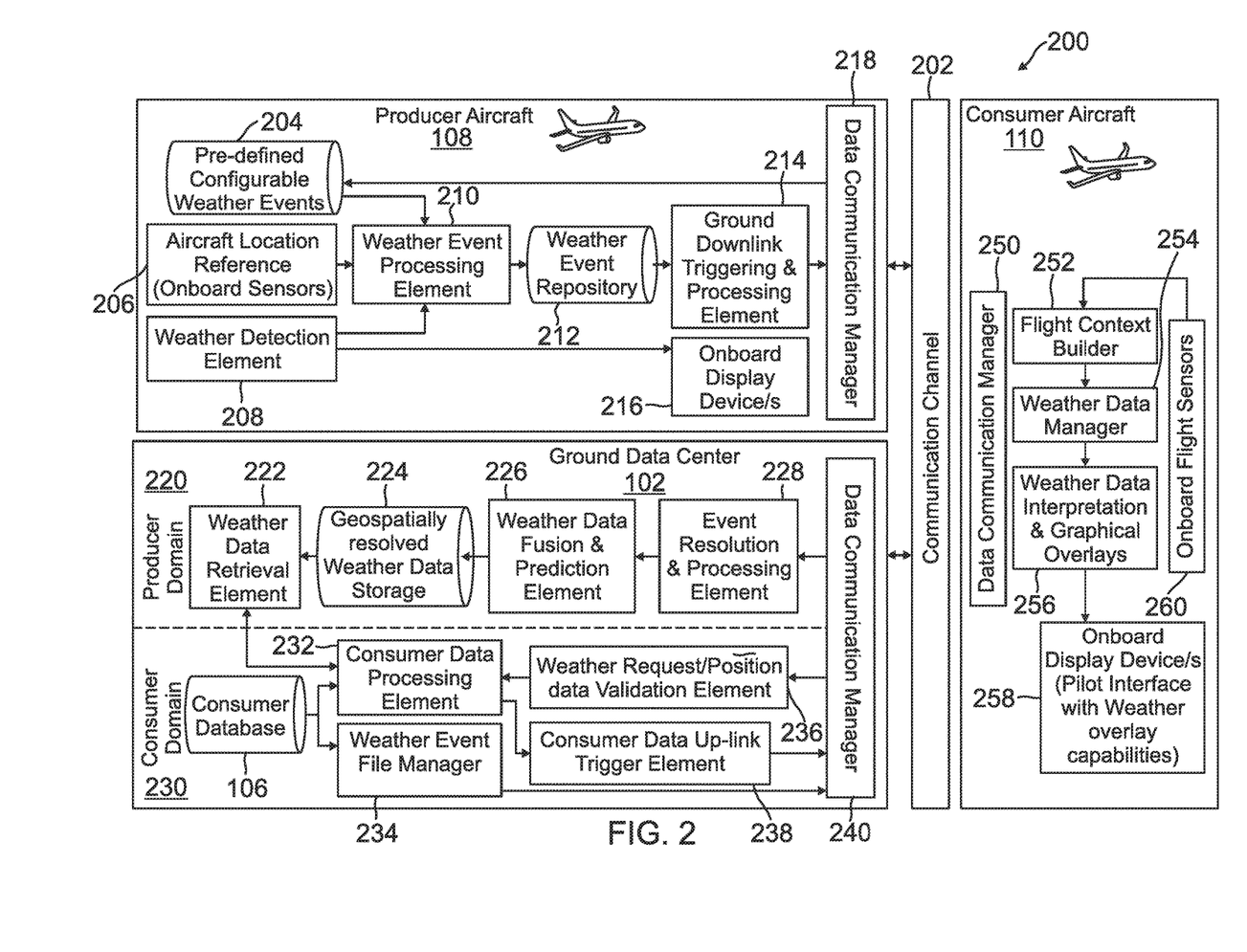
FIG. 2 is an illustration of high level functional blocks of an event based weather data exchange system of an embodiment.

Referring to FIG. 2, a high level functional block diagram of an event based weather data exchange system 200 of an embodiment, from the context of a producer aircraft 108, ground data center 102 and consumer aircraft 110 is provided. Each functional block performs a specific task to achieve the end objective of sharing the critical weather events (as detected by the producer aircraft 108) to the ground data center 102 and further to the consumer aircraft 110. Moreover, some blocks of the event based weather data exchange system 200 may include one or more processors that implement instructions stored in one or more memories. Moreover, the one or more memories may be used to store information.

The producer aircraft 108 includes a pre-defined configurable weather events block 204. Included in block 204 is a configurable file via which a user can define which type of weather detections are to be classified as critical weather events. The parameters are defined based on the capabilities of an onboard weather detection unit as not all weather detection units have all the features enabled. This also allows the user to configure threshold values for each of the weather phenomenon, beyond which they get classified as critical weather events. Example thresholds include, but are not limited to, thresholds for precipitation levels (that are above a particular dBz), threshold values for the detected peak and average Eddy Dissipation Rate (EDR), thresholds for turbulence and threshold values for the total number of hail and or lightning events. In an embodiment, the system allows a mechanism to update a configurable file of the pre-defined configurable weather events at block 204 via a secure up-link message from the ground data center. In an embodiment, depending on the type of aircrafts that get registered as consumers, region of flights (based on the registered consumer flight paths), the ground data center 102 shall determine which weather phenomenon could be treated as critical and also determines the respective threshold values to be checked for. The ground data center 102 can then send the list of critical weather events to the producer aircraft 108 (via up-link request to all producer aircraft 108-1 through 108-n) which would then be used for re-configuring the weather data configurable file at block 204. Based on the modified information, producer aircraft 108 filters and provides only weather data that has been requested by the ground data center 102. This helps reduce the bandwidth utilization by restricting downlink of only the weather data that is needed by a consumer 110.

The producer aircraft 108 also includes a weather detection element block 208. The weather detection element block includes one or more onboard sensors that are used for detecting the weather prevailing ahead of the producer aircraft 108. The detected weather gets portrayed on an onboard display 216 as seen by the pilot. Also, the data detected is made available to a weather event processing element block 210 for further processing. The weather event processing element block 210 processes the weather data (available from the weather detection element block 208) and determines if any of the listed pre-defined configurable weather events from block 204 are beyond the threshold limits. Ones beyond the threshold limits are classified as critical weather events. The weather event processing element block 210 is also responsible for associating a current time stamp UTC to all such critical weather events in embodiment. Moreover, it may also be responsible for associating a geo-reference tags (latitude, longitude & altitude) for each of the critical weather events that has been detected. The data required for geo-reference tags is obtained from the onboard sensors (such as, but not limited to, GPS/INS/RadAlt etc.) that are part of the aircraft location reference block 206.

Further, the producer aircraft 108 also includes a weather event repository bock 212. This is a storage element (database) that is available onboard the aircraft used for recording the critical weather events. All the critical weather events and associated geo-spatial tags and corresponding UTC tags are stored for any future data retrieval in the weather event repository block 212. Ground downlink triggering and processing element at block 214 is used to check for the available critical weather events as stored in the weather event repository 212, and if available, trigger the weather data downlink to the ground data center 102 via the available onboard data communication manager 218. The Ground downlink triggering and processing element 214 may have built-in intelligence to constantly compare and determine whether a particular critical event has been down-linked or not (keeps track of events downlinked). Only delta changes in information gets downlinked in an embodiment to minimize communication downlinks.

The ground data center 102 functional blocks are segregated based on whether they are performed in the producer domain 220 or the consumer domain 230 as illustrated in FIG. 2. In the producer domain 220, the ground data center 102 includes an event resolution and processing element 228. The functionality of event resolution and processing element 228 block is to autonomously process the down-linked data when downlink data is available from any registered producer aircraft. In an embodiment, the event resolution and processing element 228, identifies all critical weather events and translates each critical weather event into predefined formats (based on associated latitude, longitude, altitude, UTC, data confidence level). This module may be capable of processing the data in parallel as received from one or multiple producer aircraft.

Figure 3:
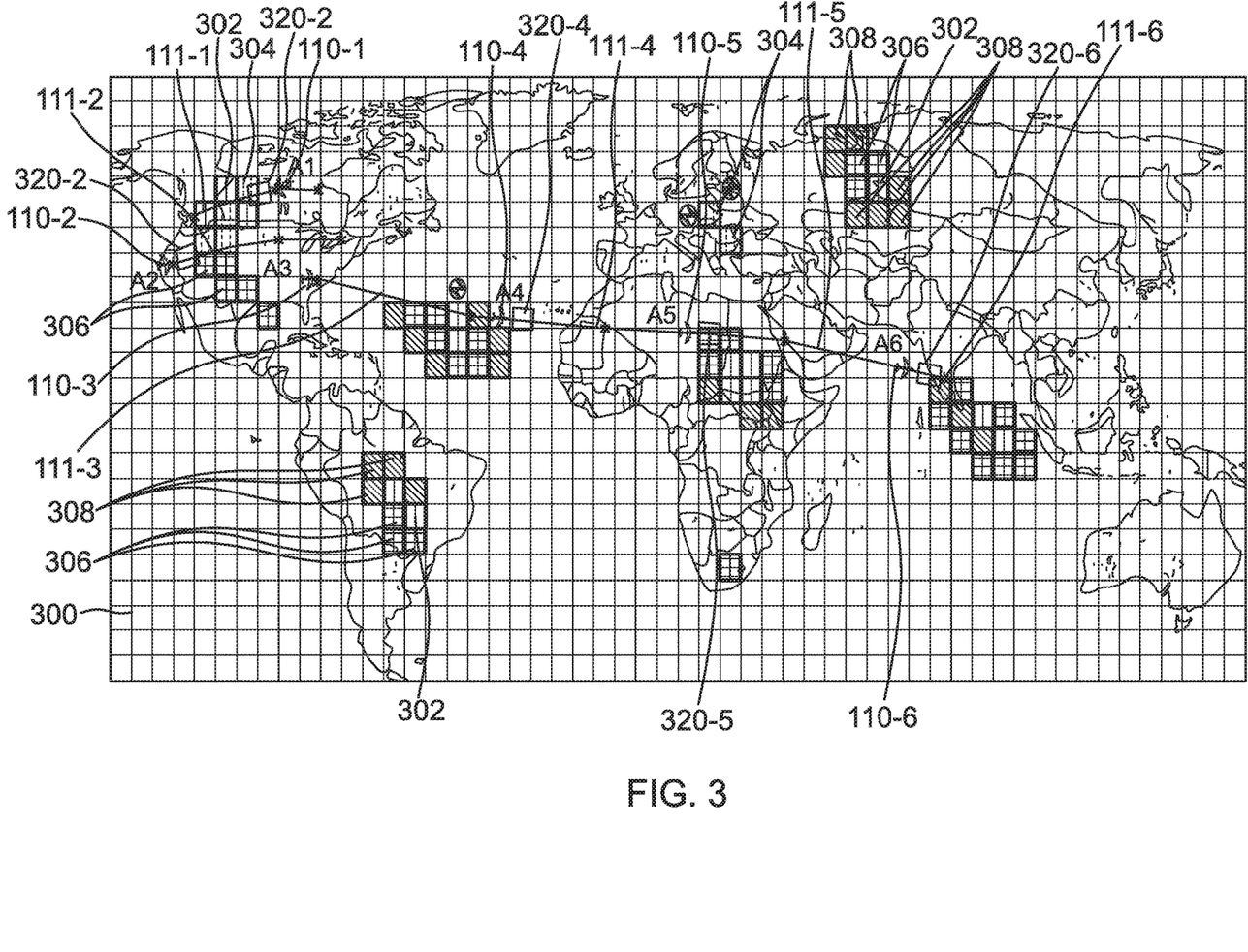
FIG. 3 is an illustration of a geo-spatial grid overlaying an area of travel of an embodiment.

The producer domain 220 of the ground data center 102 further includes a weather data fusion and prediction element 226. The weather data fusion and prediction element 226 fuses processed critical weather data information as obtained from the event resolution and processing element 228 and any other source (ground based weather data) such that a unified image of weather event is produced. Once fused, based on the availability of data, prediction algorithms in the weather data fusion and prediction element 226 get executed in order to forecast any of the weather related phenomenon. The fused and predicted weather data is stored in a predefined grid (partitioned geo-spatially grid) with a geo-spatially resolved weather data storage block 224. An example of a geo-spatial grid 300 that covers an area of travel, which is the world in this example, is illustrated in FIG. 3. In embodiments, fused and predicted weather data is associated with one or more grid cell locations of the geo-spatial grid 300 and is stored in memory, such as data base 106, in the geo-spatially resolved weather data storage 224. Any new updates pertaining to any of the weather events overwrite the existing information in embodiments, such that the latest weather data can be made available at any given point of time.

The producer domain 220 of the ground data center 102 further includes a weather data retrieval element 222. The functionality of the weather data retrieval element 222 is to retrieve the critical weather information as requested by a consumer aircraft. Upon a request from a consumer aircraft 110, the weather data retrieval element 222 runs a query in the geo-spatially resolved weather data storage 224. The request is based on one or more grid cell locations in the geo-spatial grid 300 associated with the area of travel of the consumer aircraft 110.

The consumer domain 230 of the ground data center 102 includes two modes in the embodiment of FIG. 2. In a first mode the consumer domain 230 receives the current location of the consumer aircraft 110 and then checks for presence of any of the critical weather events of relevance to the consumer aircraft 110 (based on its flight plan) and if any such events are available. The consumer domain 230 in the first mode triggers an automatic weather alert message (critical weather event data) when the presence of a critical weather event is of relevance to the consumer aircraft 110 is detected. In a second mode, the ground data center 102 accepts specific requests (e.g. weather request at a specific location) from a consumer aircraft 110, validates the requests, retrieves the relevant information from a ground data repository (i.e. the geospatially resolved weather data storage 224), and then up-links the information to the requesting consumer aircraft 110.

The consumer domain 230 of the ground data center 102 includes a weather request/position data validation element 236. In the first mode, the weather request/position data validation element 236 validates the location references (current geo-spatial coordinates) as shared by the consumer aircraft 110. In the second mode, the weather request/position data validation element 236 validates the weather requests from the consumer aircraft 110. Once validated and authorized, the data gets processed further by the consumer data processing element 232. The functionality of the consumer data processing element 232 is to get the consumer aircraft current location information, identify geo-spatial areas of interest (bounding box based at least in part on consumer consumption needs, aircraft current location and the flight path) that intersect with predefined grid cells (overlaid across an area of travel) and look for the presence of any of the critical weather events. An illustration of this is also provided in FIG. 3 as further discussed below. In case there is any of the critical weather event being identified in the overlap region, an auto up-link of weather alert to that particular consumer aircraft gets triggered. Also, the consumer data processing element 232 is responsible for fetching the relevant data as requested (specific weather requests, e.g. pertaining to a specific geo-spatial location) and information pertaining to consumer aircraft (like flight path, time of departure, time of arrival, wing load capabilities etc.) from a consumer database 106. These parameters are further used by the consumer data processing element 232 in determining critical weather events that are relevant to a particular consumer aircraft 110. The consumer data processing element 232 is also responsible for associating geo-spatial tags and the time stamp UTC for the identified weather events. In an embodiment, a three dimensional geo-spatial grid (latitude, longitude & altitude) holds the critical weather data as obtained from the producer aircraft 108.

The consumer domain 230 of the ground data center 102 also includes a consumer data up-link trigger element 238. The consumer data up-link trigger element 238 initiates an up-link trigger to the identified consumer aircraft 110 upon detection of any of the critical weather event that is applicable for that particular consumer aircraft 110. The consumer domain 230 of the ground data center 102 further includes a weather event file manager 234. The weather event file manager 234 determines which weather data could be classified as critical based on the wing load capabilities of the registered consumer aircraft 110. Based on this, a special up-link request may be generated and broadcasted to all the producer aircraft 108 via data communication manager 240 and communication channel 202 to update their respective configurable weather events file such that they start filtering only for such critical weather events and down-link them as and when they get detected.

The consumer aircraft 110 is illustrated in FIG. 2 as having a flight context builder 252. The flight context builder 252 periodically shares the then current location of the consumer aircraft 110 with the ground data center 102 via data communication manager 250 and communication channel 202. Also, the flight context builder 252 is responsible for generating any of the special weather related requests pertaining to a specific location (based on the context of the flight, for example, take-off, cruise, landing, emergency situation, etc.). The required flight parameters are obtained from the onboard systems such as, but not limited to, an air data computer, a flight management system, a flight control system and on board flight sensors 260, such as, but not limited to, radio altimeter etc.

The consumer aircraft 110 further includes a weather data manager 254 and a weather data interpretation and graphical overlays 256. These blocks 254 and 256 are responsible for processing the weather data as received from the ground data center 102. They decode the weather data, interpret it and extract the critical weather event related information and based on the flight context generates the weather display overlays. The interpreted weather events get portrayed onto onboard display devices 258 so that the pilot could visualize the critical weather events and take the necessary actions.

State of the art onboard weather radars are capable of not only detecting bad weather (where-in the precipitation levels/density of water molecules is higher than the desirable threshold values) but also they are capable of detecting/predicting some of the hazardous weather phenomenon like turbulence, wind shear, hail, lightning, reactive turbulence (eddy dissipation rates) etc. Below is a detailed description of algorithms that help detect and auto up-link the relevant critical weather data to the registered consumer aircraft as and when they get detected.

A ground data center 102 is responsible for collecting the data down-linked from one or many producer aircraft and also is responsible for up-inking the weather data as requested by the consumer aircraft or in case there is any critical weather data being detected prevailing in the path of the consumer aircraft as discussed above. As shown in FIG. 3, the ground data center splits the entire globe (travel area or area of travel) into equally-spaced grid cells, and these grid cells act as reference while updating any of the new weather data as received from any of the producer aircraft. The data received from the producer aircraft gets processed (fused and geo-spatially resolved) and stored into one or many of the corresponding predefined geo-spatial grid cell of the geo-spatial grid 300. FIG. 3 illustrates six consumer vehicles 110-1 through 110-6 and their projected travel paths 111-1 through 111-6 through the travel area. Also, for illustration purposes select grid cells 302, 304, 306 and 308 are indicated has being associated with locations in the travel area with different types of detected critical weather events.

Based on the current location of any of the consumer aircraft, an embodiment defines a bounding box 320-1, 320-2, 320-4, 320-5 and 320-6 for its associate aircraft 11-1, 110-2, 110-4, 110-5 and 110-6. A bounding box (generally designated as 320) is formed in an immediate travel path of an associated consumer aircraft 110. The dimension or size of the bounding box 320 is configurable based at least in part on one of the needs of the consumer aircraft 119, travel path of the consumer aircraft 110 and the current phase of the flight. Hence, in one embodiment, a bounding box 320 may be dynamically sized as the consumer aircraft traverses through its flight path. A critical weather event alert is generated, in an embodiment, when an overlap between a bounding box 320 and at least one geo-spatial grid cell indicating a critical weather event occurs. An overlap check may be done on a periodic basis (periodicity of which is determined based on the update rates which is configurable). Moreover, in an embodiment, when the ground data center 102 detects the presence of any critical weather events, the ground data center 102 first checks if the detected weather was already transmitted to the consumer, if not, the ground data center 102 triggers an uplink to the relevant consumer aircraft 110 providing the weather data as a display overlay.

Figure 4:
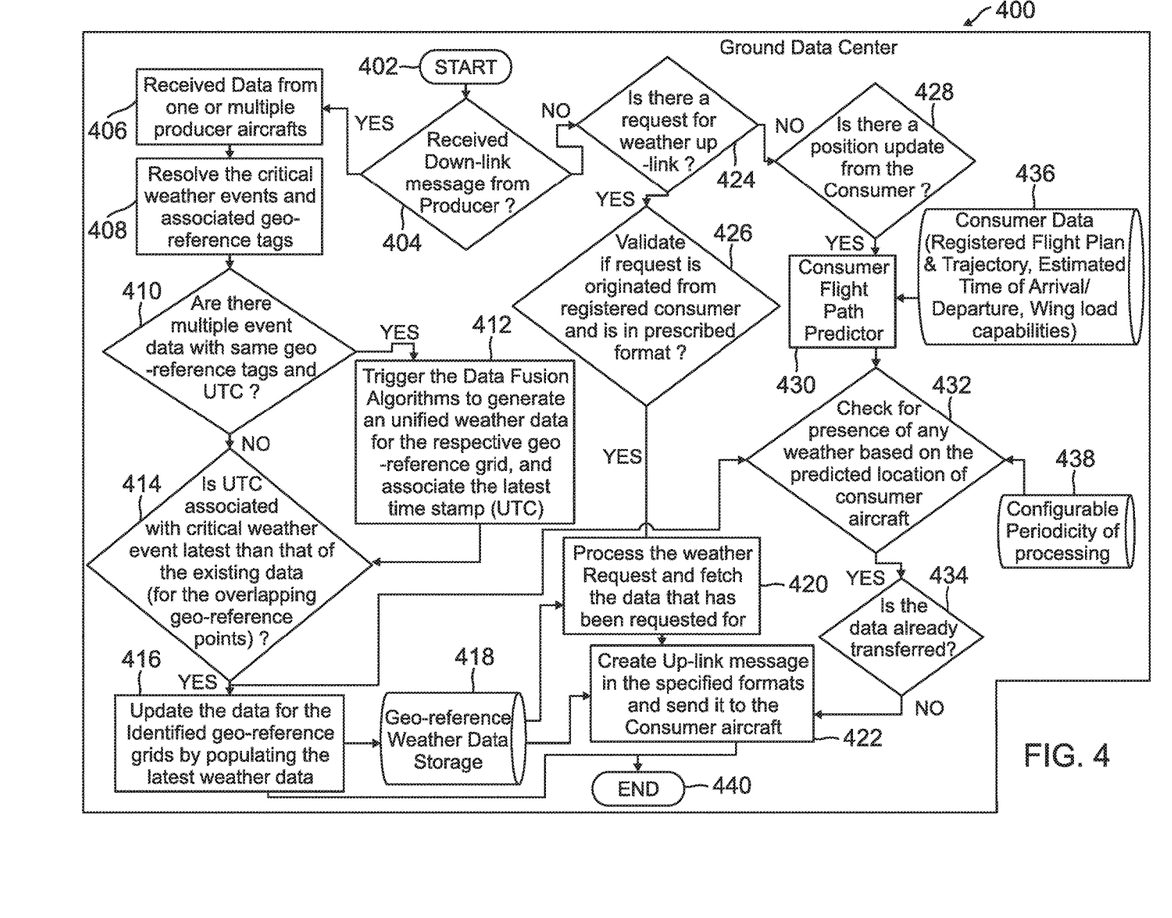
FIG. 4 is flow diagram of processes in a base station in an embodiment.

An example process flow diagram 400 implemented by a ground data center 102 in an embodiment is illustrated in FIG. 4. The process starts at step (402). It is determined if a down-link message is received from a producer by monitoring for producer down-links (404). Upon receiving data from a down-link message from a producer aircraft (406), the ground data center 102 processes the data and resolves critical weather events and associated geo-reference tags (408). It is then determined if there are multiple event data with the same geo-reference tags (grids) and time stamp UTC (410). If it is determined that there are multiple event data with the same geo-reference tags and time stamp UTC at step (410), data fusion algorithms are triggered that generate unified weather date for respective geo-reference grids, and the associate the latest time stamp UTC (412). It is then determined if the time stamp UTC associated with critical weather events is the latest in view of exiting data (for overlapping geographical reference points) (414). This is done by comparing the time stamp UTC of the existing data with that of the newly received data and the confidence levels with which the data has been shared. If the received data is the newest, the data for the identified geo-reference grids are updated by populating the latest weather data at (416). If it is not, the identified geo-reference grids are not updated. In case where the data obtained is newest, the data in the pre-defined geo-spatial grid gets replaced with the latest data and gets stored into a geo-referenced weather data storage (418) in the at least one memory of the ground data center 102. When there is any new weather data update made to the geo-spatial grid 300, the ground data center 102 checks if any of the consumer aircraft 110 are on a path that leads to the updated weather data and are going to get affected due to the new weather update (432). If it is determined (based on location of flight and the wing-load capability of the consumer aircraft) that the new updated weather data has an adverse effect, the ground data center 102 shall trigger an auto uplink weather alert message (in the form of a weather overlay) (422).

As discussed above, the ground data center 102 can receive requests from the consumer aircraft 110 in embodiments. For example, the ground data center 102 can receive specific request for weather data as needed by the consumer aircraft 110 as well as location update messages that may contain current latitude, longitude and altitude information pertaining to the consumer aircraft 110. Hence, referring to process flow diagram 400, in the situation the ground station 102 receives request from consumer aircraft 110 is for a specific weather data (424), the ground data center 102 validates and decode the request (426). The requested data is then fetched from the geo-referenced weather data storage database (420). Once the data is fetched, the ground data center 102 up-links the data to the corresponding consumer aircraft 110 in the form of a weather overlay (422).

In case were the ground data center 102 has received a position update of any of the registered consumer aircraft (428), the ground data center 102 shall update the consumer flight path predictor with the new location reference (430). Consumer data, such as flight plan and trajectory, estimated time of arrival/departure, wind load capacities etc. (436) are provided to the consumer flight path predictor (430). The flight path is used to define the location of interest to further process and check for presence of critical weather data (432). The checking for the presence of weather events is periodically processed (438) as discussed below. In an embodiment it is then determined if the data has already been transferred (434). If it has not already been transferred, the up-link message is created and sent to the consumer aircraft (422). If it is determined that the date has already been transferred, the data is not uplinked again. In case there aren't any position updates, the consumer flight path predictor shall periodically predict the new location (based on registered flight plan, trajectories, estimated time of travel etc.) (436) and this shall be used for periodic processing (432) of checking for critical weather data on the consumer's flight path. The process end at step (440) in this example embodiment.

EXAMPLE EMBODIMENTS

Example 1, includes a method of gathering and distributing critical weather event information. The method includes monitoring for critical weather events based on defined critical weather event thresholds with an onboard producer weather detection unit of at least one producer vehicle. Current time stamp and geolocation information are associated with each detected critical weather event. The detected critical weather event, associated time stamp and geolocation information are communicated to a base station. The detected critical weather event is fused with other weather data at the base station to produce a unified weather event image that includes the detected critical weather event. Prediction algorithms are applied to the unified weather event image at the base station to produce predicted weather data including the detected critical weather event parsed into predefined grid cells of a geo-spatial grid. The predicted weather data with the detected critical weather event is up-linked to a consumer vehicle anticipated to travel within at least one grid cell of the geo-spatial grid associated with the predicted weather data. In addition, critical weather event thresholds are dynamically reconfigured at the producer vehicle based at least in part on consumption needs of the consumer vehicle.

Example 2 includes the method of Example 1, wherein the consumption needs relate to operating parameters of the consumer vehicle.

Example 3 includes the method of any of the Examples 1-2, further comprising; tracking down-linked critical weather events at the at least one producer vehicle.

Example 4 includes the method of any of the Examples 1-3, wherein the geo-spatial grid is a three dimensional grid.

Example 5 includes the method of any of the Examples 1-4, further comprising; generating unified weather data associated with the at least one grid cell of the geo-spatial grid when more than one detected critical weather event is associated with the at least one grid cell having the same time stamp.

Example 6 includes the method of any of the Examples 1-5, further comprising; storing the predicted weather data in a data base and updating the predicted weather data in the data base upon the receipt of detected critical weather event from the at least one producer.

Example 7 includes the method of any of the Examples 1-6, further comprising; down-linking a consumer position update to the base station.

Example 8 includes the method of any of the Examples 1-7, wherein the base station is configured to determine a consumer vehicle anticipated travel path based at least in part on one of starting and ending locations, a down-linked consumer position update, a registered flight plan and trajectory, an estimated time of departure and an estimated time of arrival.

Example 9 includes the method of any of the Examples 1-8, further comprising; determining a bounding box for a consuming vehicle. The size of the bounding box configured based on consumption needs of the consumer vehicle. The bounding box being in the immediate travel path of consumer vehicle. Moreover, the uploading the predicted weather data with the detected critical weather event to the consumer vehicle being based at least in part on an overlapping of the bounding box and the at least one grid cell of the geo-spatial grid associated with the predicted weather data.

Example 10 includes a method of gathering and distributing critical weather event information. The method includes monitoring at least one sensor of at least one producer for critical weather events based on critical weather event thresholds. A geo-location tag and a time stamp is attached to monitored critical weather events from the at least one producer. Critical weather events are down-linked from the at least one producer vehicle to a base station. The detected critical weather event are fused with other weather data at the base station to produce a unified weather event image including the detected critical weather event. The unified weather event image is applied to a geo-spatial grid over a travel area. The geo-spatial grid has a plurality of grid cells. A bounding box is determined for a consuming vehicle. The size of the bounding box is configured based on consumption needs of the consumer vehicle. The bounding box is in the immediate travel path of consumer vehicle represented on the geo-spatial grid. A critical weather event is up-linked to the consumer aircraft when the bounding box overlaps at least one grid cell of the geo-spatial grid associated with the critical weather event.

Example 11 includes the method of Examples 10, further comprising, setting critical weather event thresholds at least one producer vehicle based at least in part on the consumption needs of a consumer vehicle.

Example 12 includes the method of any of the Examples 10-11, wherein the consumption needs of the consumer aircraft relate at least in part to the phase of the flight of the consumer aircraft.

Example 13 includes the method of any of the Examples 10-12, wherein the geo-reference grid is a three dimensional grid that represents longitude, latitude and altitude.

Example 14 includes the method of any of the Examples 10-13, wherein the base station is configured to determine a consumer vehicle anticipated travel path based at least in part on one of starting and ending locations, a down-linked consumer position update, a registered flight plan and trajectory, an estimated time of departure and an estimated time of arrival.

Example 15 includes the method of any of the Examples 10-14, further comprising; storing monitored critical weather events at the at least one producer vehicle when a down-link to the base station cannot be established.

Example 16 includes the method of any of the Examples 10-15, wherein the consumption needs of the consumer aircraft relate at least in part to operating parameters of the consumer vehicle.

Example 17 includes a base station to gather and distribute critical weather event information. The base station includes a data communication manager, at least one memory and at least one processor. The data communication manager is configured to communicate with at least one producer vehicle and at least one consumer vehicle. The at least one memory is configured to store at least operating instructions and critical weather alert information. The least one processor is configured to execute the operating instructions. The base station further includes a producer domain that is implemented by the at least one processor. The producer domain is in communication with the data communication manager. The producer domain includes a weather data fusion and prediction element that is configured to fuse critical weather event data communicated from the at least one producer vehicle with other weather gathering sources to generate a unified weather event image and forecast information for an area of travel that is overlaid with a geo-spatial grid. The geo-spatial grid having a plurality of grid cells. Each grid cell associated with a location in the area of travel and an associated portion of the unified weather event image and forecast information. The producer domain configured to store the unified weather event image and forecast information and geo-spatial grid in the at least one memory. The base station further includes a consumer domain. The consumer domain is implemented by the at least one processor and is in communication with the data communication manager. The consumer domain includes a consumer data processing element that is configured to determine a consumer vehicle location and travel path information for the at least one consumer vehicle. The consumer data processing element is further configured to determine a bounding box for the at least one consumer vehicle. The size of the bounding box being configurable based on consumption needs of the at least one consumer vehicle. The bounding box being in an immediate travel path of the at least one consumer vehicle represented on the geo-spatial grid. The consumer data processing element is configured to identifying critical weather events for the at least one consumer vehicle by determining an overlapping of the bounding box of the at least one consumer vehicle with at least one grid cell of the geo-spatial grid associated with critical weather event data. The consumer domain further being configured to generate a critical weather event message to be sent to the at least one consumer vehicle via the communication manager upon determination of the overlap.

Example 18 includes the base station of Example 17, wherein the producer domain further comprises; an event resolution and processing element configured to identify and translate each critical weather event down-linked from a registered producer vehicle.

Example 19 includes the base station of any of the Examples 17-18, wherein the consumption needs of the at least one consumer vehicle relate to operational parameters of the at least one consumer vehicle.

Example 20 includes the base station of any of the Examples 17-19, wherein the consumer domain is further configured to communicate with the at least one producer aircraft to dynamically set critical weather event thresholds at the at least one producer that are related to a current consumption need of the at least one consumer vehicle.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of gathering and distributing critical weather event information, the method comprising:
monitoring for critical weather events based on defined critical weather event thresholds with an onboard producer weather detection unit of at least one producer vehicle;
associating current time stamp and geolocation information to each detected critical weather event;
communicating the detected critical weather event and associated time stamp and geolocation information to a base station;
fusing the detected critical weather event with other weather data at the base station to produce a unified weather event image including the detected critical weather event;
applying prediction algorithms to the unified weather event image at the base station to produce predicted weather data including the detected critical weather event parsed into predefined grid cells of a geo-spatial grid;
up-linking le predicted weather data with the detected critical weather event to a consumer vehicle anticipated to travel within at least one grid cell of the geo-spatial grid associated with the predicted weather data; and
dynamically reconfiguring critical weather event thresholds at the producer vehicle based at least in part on consumption needs of the consumer vehicle.

2. The method of claim 1, wherein the consumption needs relate to operating parameters of the consumer vehicle.

3. The method of claim 1, further comprising;
tracking down-linked critical weather events at the at least one producer vehicle.

4. The method of claim 1, wherein the geo-spatial grid is a three dimensional grid.

5. The method of claim 1, further comprising:
generating unified weather data associated with the at least one grid cell of the geo-spatial grid when more than one detected critical weather event associated with the at least one grid cell has the same time stamp.

6. The method of claim 1, further comprising:
storing the predicted weather data in a data base; and
updating the predicted weather data in the data base upon the receipt of detected critical weather event from the at least one producer.

7. The method of claim 1, further comprising:
down-linking a consumer position update to the base station.

8. The method of claim 1, wherein the base station is configured to determine a consumer vehicle anticipated travel path based at least in part on one of starting and ending locations, a down-linked consumer position update, a registered flight plan and trajectory, an estimated time of departure and an estimated time of arrival.

9. The method claim 1, further comprising:
determining a bounding box for a consuming vehicle, the size of the bounding box configured based on consumption needs of the consumer vehicle, the bounding box being in the immediate travel path of consumer vehicle, the uploading the predicted weather data with the detected critical weather event to the consumer vehicle being based at least in part on an overlapping of the bounding box and the at least one grid cell of the geo-spatial grid associated with the predicted weather data.

10. A method of gathering and distributing critical weather event information, the method comprising:
monitoring at least one sensor of at least one producer for critical weather events based on critical weather event thresholds;
attaching a geo-location tag and a time stamp to monitored critical weather events by the at least one producer;
down-linking critical weather events from the at least one producer vehicle to a base station;
fusing the detected critical weather event with other weather data at the base station to produce a unified weather event image including the detected critical weather event;
applying the unified weather event image to a geo-spatial grid over a travel area, the geo-spatial grid having a plurality of grid cells;
determining a bounding box for a consuming vehicle, the size of the bounding box configured based on consumption needs of the consumer vehicle, the bounding box being in the immediate travel path of the consumer vehicle represented on the geo-spatial grid; and
up-linking a critical weather event to the consumer aircraft when the bounding box overlaps at least one grid cell of the geo-spatial grid associated with the critical weather event.

11. The method of claim 10, further comprising:
setting critical weather event thresholds at the at least one producer vehicle based at least in part on the consumption needs of a consumer vehicle.

12. The method of claim 10, wherein the consumption needs of the consumer aircraft relate at least in part to the phase of the flight of the consumer aircraft.

13. The method of claim 10, wherein the geo-reference grid is a three dimensional grid that represents longitude, latitude and altitude.

14. The method of claim 10, wherein the base station is configured to determine a consumer vehicle anticipated travel path based at least in part on one of starting and ending locations, a down-linked consumer position update, a registered flight plan and trajectory, an estimated time of departure and an estimated time of arrival.

15. The method of claim 10, further comprising:
storing monitored critical weather events at the at least one producer vehicle when a down-link to the base station cannot be established.

16. The method of claim 10, wherein the consumption needs of the consumer aircraft relate at least in part to operating parameters of the consumer vehicle.

17. A base station to gather and distribute critical weather event information, the base station comprising:
a data communication manager configured to communicate with at least one producer vehicle and at least one consumer vehicle;
at least one memory configured to store at least operating instructions and critical weather alert information;
at least one processor configured to execute the operating instructions;
a producer domain implemented by the at least one processor, the producer domain in communication with the data communication manager, the producer domain including,
a weather data fusion and prediction element configured to fuse critical weather event data communicated from the at least one producer vehicle with other weather gathering sources to generate a unified weather event image and forecast information for an area of travel that is overlaid with a geo-spatial grid, the geo-spatial grid having a plurality of grid cells, each grid cell associated with a location in the area of travel and an associated portion of the unified weather event image and forecast information, the producer domain configured to store the unified weather event image and forecast information and geo-spatial grid in the at least one memory; and
a consumer domain implemented by the at least one processor, in communication with the data communication manager, the consumer domain including,
a consumer data processing element configured to determine consumer vehicle location and travel path information for the at least one consumer vehicle, the consumer data processing element further configured to determine a bounding box for the at least one consumer vehicle, the size of the bounding box being configurable based on consumption needs of the at least one consumer vehicle, the bounding box being in an immediate travel path of the at least one consumer vehicle represented on the geo-spatial grid, the consumer data processing element configured to identifying critical weather events for the at least one consumer vehicle by determining an overlapping of the bounding box of the at least one consumer vehicle with at least one grid cell of the geo-spatial grid associated with critical weather event data, the consumer domain further configured to generate a critical weather event message to be sent to the at least consumer vehicle via the communication manager upon determination of the overlap.

18. The base station of claim 17, wherein the producer domain further comprising:
an event resolution and processing element configured to identify and translate each critical weather event down-linked from a registered producer vehicle.

19. The base station of claim 17, wherein the consumption needs of the at least one consumer vehicle relate to operational parameters of the at least one consumer vehicle.

20. The base station of claim 17, wherein the consumer domain is further configured to communicate with the at least one producer aircraft to dynamically set critical weather event thresholds at the at least one producer that are related to a current consumption need of the at least one consumer vehicle.

* * * * *

UNITED STATES PATENT AND TRADEMARK OFFICE
CERTIFICATE OF CORRECTION

PATENT NO. : 10,147,326 B2
APPLICATION NO. : 15/443298
DATED : December 4, 2018
INVENTOR(S) : Anantha Chandrasekhar Koduru et al.

Page 1 of 1

It is certified that error appears in the above-identified patent and that said Letters Patent is hereby corrected as shown below:

In the Claims

Column 14 in Claim 1, Line 44, delete "up-linking le" and insert --up-linking the--.

Column 15 in Claim 9, Line 10, delete "method claim" and insert --method of claim--.

Signed and Sealed this
Fourth Day of June, 2019

Andrei Iancu
*Director of the United States Patent and Trademark Office*